US010902345B2

(12) United States Patent
Cavalin et al.

(10) Patent No.: US 10,902,345 B2
(45) Date of Patent: Jan. 26, 2021

(54) PREDICTING USER POSTING BEHAVIOR IN SOCIAL MEDIA APPLICATIONS

(71) Applicant: International Business Machines Corporation, Armonk, NY (US)

(72) Inventors: Paulo Rodrigo Cavalin, Rio de Janeiro (BR); Maira Gatti de Bayser, Rio de Janeiro (BR); Alexandre Rademaker, Rio de Janeiro (BR); Cicero Nogueira Dos Santos, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 933 days.

(21) Appl. No.: 15/409,999

(22) Filed: Jan. 19, 2017

(65) Prior Publication Data

US 2018/0204125 A1   Jul. 19, 2018

(51) Int. Cl.
| | | |
|---|---|---|
| *G06N 20/00* | (2019.01) | |
| *H04L 29/08* | (2006.01) | |
| *G06Q 30/02* | (2012.01) | |
| *G06Q 50/00* | (2012.01) | |
| *G06Q 10/10* | (2012.01) | |

(52) U.S. Cl.
CPC ............. *G06N 20/00* (2019.01); *G06Q 10/10* (2013.01); *G06Q 30/02* (2013.01); *G06Q 50/01* (2013.01); *H04L 67/22* (2013.01); *H04L 67/306* (2013.01)

(58) Field of Classification Search
CPC ........ G06N 20/00; G06N 5/04; G06N 99/005; G06Q 10/10; G06Q 30/02; G06Q 50/01; H04L 67/22; H04L 67/306
USPC .......................................................... 706/12
See application file for complete search history.

(56) References Cited

U.S. PATENT DOCUMENTS

| | | | |
|---|---|---|---|
| 9,462,313 B1 | 10/2016 | Sbaiz et al. | |
| 10,074,102 B2 | 9/2018 | N et al. | |
| 10,453,099 B2 | 10/2019 | Korpusik et al. | |
| 2013/0159219 A1* | 6/2013 | Pantel ................... | G06N 20/00 706/12 |

(Continued)

FOREIGN PATENT DOCUMENTS

WO    2014164746 A1   10/2014

OTHER PUBLICATIONS

Tang et al., "Predicting individual retweet behavior by user similarity: A multi-task learning approach", Knowledge-Based Systems 89 (2015) 681-688. (Year: 2015).*

(Continued)

*Primary Examiner* — Dave Misir
(74) *Attorney, Agent, or Firm* — Tyrus S. Cartwright (57) ABSTRACT

A computer-implemented method includes extracting a plurality of topics from a plurality of unlabeled social media posts, mapping the plurality of topics to a plurality of frequencies, each frequency in the plurality of frequencies indicating how often a corresponding topic in the plurality of topics occurs in the plurality of unlabeled social media posts, and predicting, based in part on the plurality of frequencies, a future social media posting behavior of a specific social media user, wherein the future social media posting behavior includes a specific topic about which the specific social media user is likely to post at a time in the future and a frequency with which the specific topic is likely to occur in posts of the specific social media user that are created at the time in the future.

20 Claims, 4 Drawing Sheets

(56) References Cited

U.S. PATENT DOCUMENTS

| | | | |
|---|---|---|---|
| 2014/0019443 A1 | 1/2014 | Golshan | |
| 2014/0258188 A1* | 9/2014 | Chen | G06Q 50/01 |
| | | | 706/12 |
| 2016/0239581 A1* | 8/2016 | Jaidka | G06F 16/345 |
| 2017/0220926 A1* | 8/2017 | Chhabra | G06Q 50/01 |
| 2018/0176173 A1* | 6/2018 | Keysers | G06N 7/005 |

OTHER PUBLICATIONS

Tae Yano William et al.; Predicting Response to Political Blog Posts with Topic Models; The 2009 Annual Conference of the North American Chapter of the Association for Computational Linguistics; pp. 477-485; Carnegie Mellon University.

Zhiheng Xu et al.; Modeling User Posting Behavior on Social Media; Aug. 12-16, 2012, SIGIR'12, pp. 545-554.

* cited by examiner

PREDICTING USER POSTING BEHAVIOR IN SOCIAL MEDIA APPLICATIONS

BACKGROUND OF THE DISCLOSURE

Social media encompass a variety of computer-mediated technologies that use web-based and mobile technologies (e.g., on smartphones, tablet computers, and the like) to create highly interactive platforms. Through these platforms, individuals, communities, and organizations can create, share, discuss, and modify content (including user-generated content) with others to whom they are connected through the platforms (e.g., others in their social networks).

The transmission system in which social media operate tends to be dialogic (i.e., many sources to many receivers) in nature. This is in contrast to traditional media (e.g., paper-based and electronic media, such as newspapers or television broadcasts) that operate in a monologic (i.e., one source to many receivers) transmission system. Access to social media is also often immediate, as many social media platforms are accessible through mobile applications and make it relatively simple for users to upload and consume content at any time, and from anywhere. Thus, social media have emerged as vehicles to quickly share news, opinions, entertainment, and other content with potentially large groups of people, all at once.

SUMMARY OF THE DISCLOSURE

A computer-implemented method includes extracting a plurality of topics from a plurality of unlabeled social media posts, mapping the plurality of topics to a plurality of frequencies, each frequency in the plurality of frequencies indicating how often a corresponding topic in the plurality of topics occurs in the plurality of unlabeled social media posts, and predicting, based in part on the plurality of frequencies, a future social media posting behavior of a specific social media user, wherein the future social media posting behavior includes a specific topic about which the specific social media user is likely to post at a time in the future and a frequency with which the specific topic is likely to occur in posts of the specific social media user that are created at the time in the future.

In another example, a machine-readable storage medium is encoded with instructions executable by a processor. The instructions include instructions to detect a name occurring in a component of a media playing on a first user endpoint device. The component is contained within an electronic signal. The instructions further include instructions to identify an entity in the media that is associated with the name, and to retrieve stored data that is contextually related to the entity. The instructions further include instructions to format the data as supplemental content for display to a user of the first user endpoint device.

In another example, an apparatus includes a hardware processor element and a plurality of programming code components that, when executed by the hardware processor element, cause the hardware processor element to perform operations. The operations include detecting a name occurring in a component of a media playing on a first user endpoint device, where the component is contained within an electronic signal. The operations further include identifying an entity in the media that is associated with the name and retrieving stored data that is contextually related to the entity. The operations further include formatting the data as supplemental content for display to a user of the first user endpoint device.

BRIEF DESCRIPTION OF THE DRAWINGS

So that the manner in which the above recited features of the present disclosure can be understood in detail, a more particular description of the disclosure may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In one example, a method, machine readable storage medium, and apparatus for predicting user posting behavior in social media applications is disclosed. As discussed above, social media have emerged as vehicles to quickly share news, opinions, entertainment, and other content with potentially large groups of people, all at once. Thus, due to the potential reach and influence of social media, it may be useful to be able to predict user posting behavior (e.g., possible times at which a specific user may post, possible subjects about which a specific user may post, etc.). Being able to predict a specific user's posting behavior may, for example, enable better personalization of the social media experience. For instance, the filtering of content, the display of advertising information, and the layout or design of the user interface can all be tailored on an individual basis to better suit users.

Examples of the present disclosure generate models of the posting behavior of users of social media. From these models, future posting actions (e.g., in terms of specific topics about which a specific user is likely to post and/or the frequencies with which the specific topics are likely to occur in the specific user's posts) of specific users can be predicted or even simulated. In one example, the learning techniques used to generate the models and predict the posting behavior are unsupervised or semi-supervised. For instance, the techniques may generate the models based on an analysis of unlabeled data including a collection of user posts.

Figure 1:
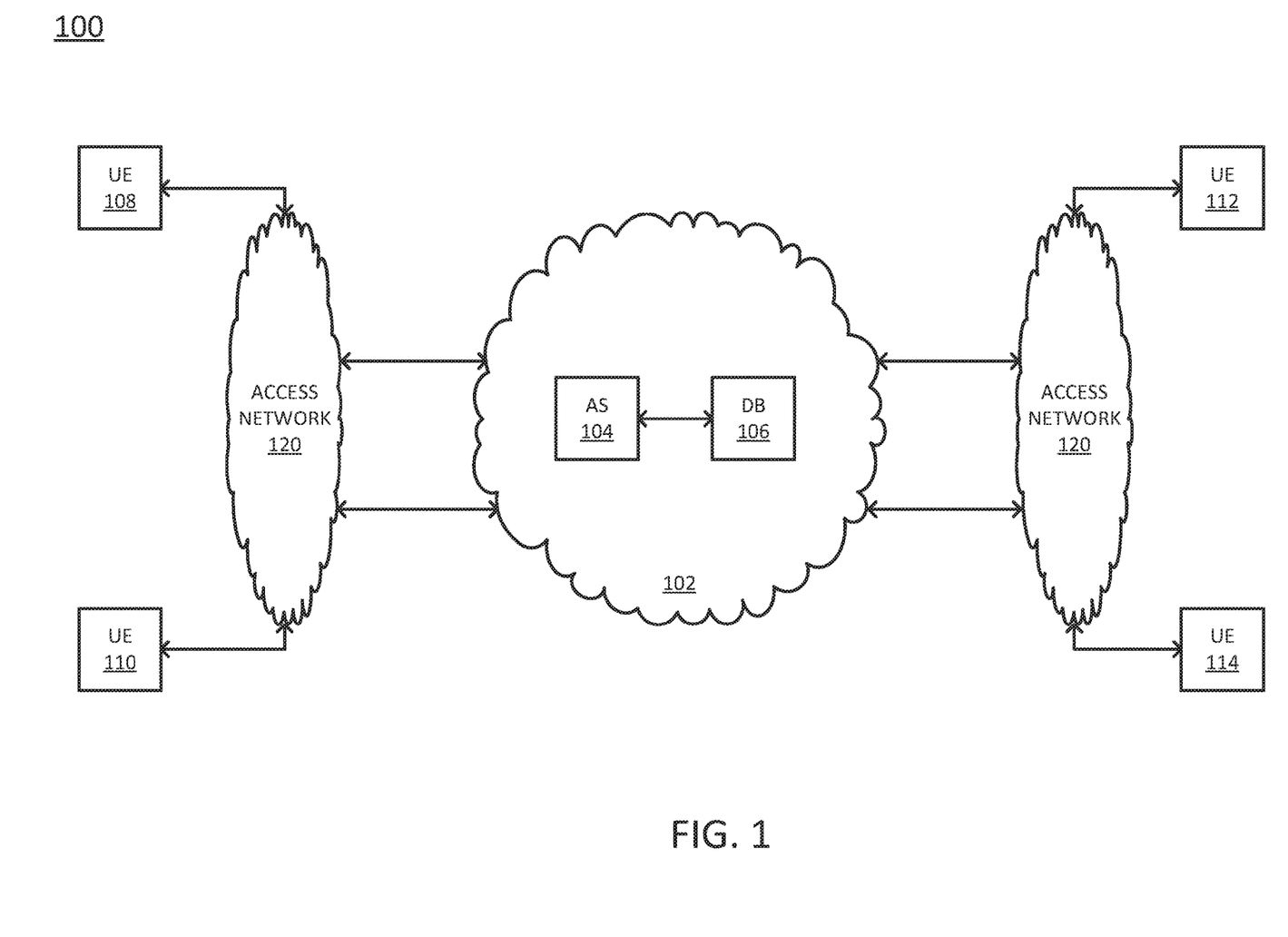
FIG. 1 depicts a high level block diagram illustrating one example of a communications network.

FIG. 1 depicts a high level block diagram illustrating one example of a communications network 100. The communications network 100 may be any type of communications network, such as for example, a traditional circuit switched or content distribution network (e.g., a public switched telephone network (PSTN)) or an Internet Protocol (IP) network (e.g., an IP Multimedia Subsystem (IMS) network, an asynchronous transfer mode (ATM) network, a wireless network, a cellular network (e.g., 2G, 3G and the like), a long term evolution (LTE) network, and the like) related to the current disclosure. It should be noted that an IP network is broadly defined as a network that uses Internet Protocol to exchange data packets. Additional illustrative IP networks include Voice over IP (VoIP) networks, Service over IP (SoIP) networks, and the like.

In one example, the network 100 may comprise a core network 102. The core network 102 may be in communication with one or more access networks 120. The access networks 120 may include a wireless access network (e.g., a WiFi network and the like), a mobile or cellular access network, a PSTN access network, a cable access network, a wired access network, and the like. In one example, the access networks 120 may all be different types of access networks, may all be the same type of access network, or some access networks may be the same type of access network and other access networks may be different types of access networks. The core network 102 and the access networks 120 may be operated by different service providers, the same service provider, or a combination thereof.

In one example, the core network 102 may include an application server (AS) 104 and a database (DB) 106. Although only a single AS 104 and a single DB 106 are illustrated, it should be noted that any number of application servers 104 or databases 106 may be deployed.

Figure 2:
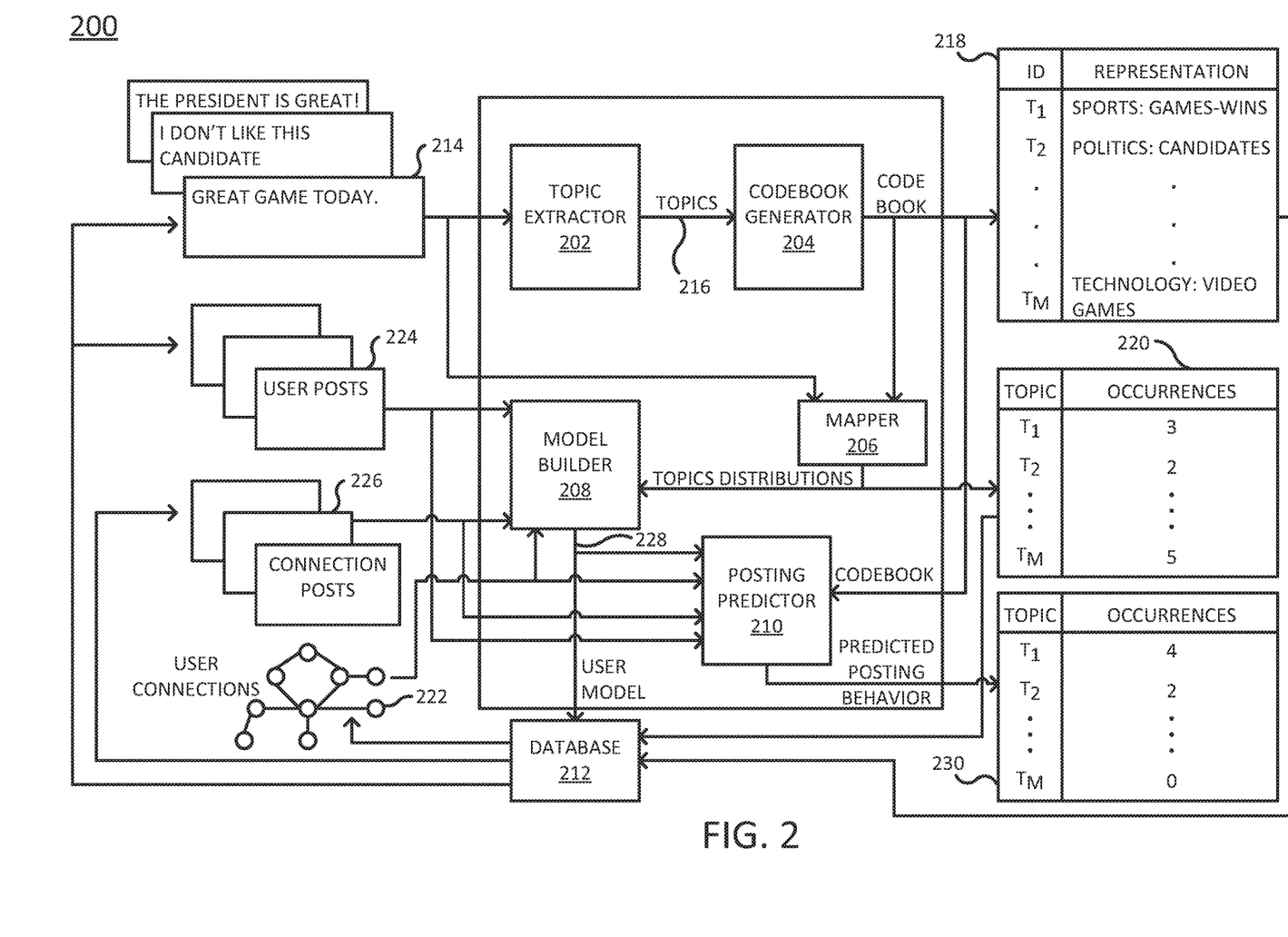
FIG. 2 depicts a high level block diagram illustrating one example of an application server of the present disclosure.
Figure 5:
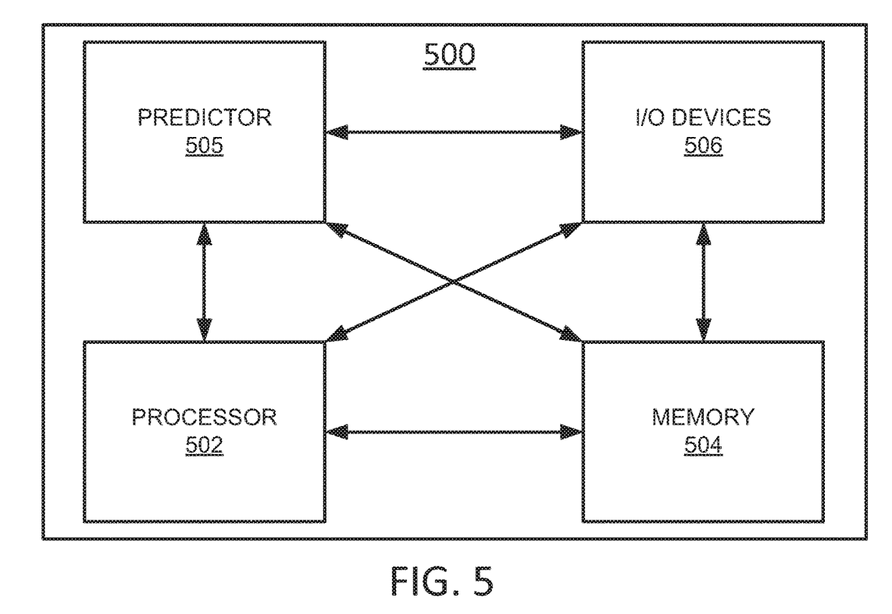
FIG. 5 is a high-level block diagram of the social media posting prediction method that is implemented using a special purpose computing device.

In one example, the AS 104 may host an application for modeling and predicting the posting behavior of social media users. The AS 104 may further host one or more social media services, such as social networking services, photo and video sharing services, blogging and microblogging services, gaming services, message board or forum services, or the like. As discussed in greater detail below, the AS 104 may exchange data with a user endpoint (UE) device and/or with the DB 106 in order to facilitate the sharing of data via social media services and/or to model and predict the posting behavior of social media users. The AS 104 may be configured in part as illustrated in FIG. 2 and described in greater detail below, or may further be configured as part of a special purpose computer as illustrated in FIG. 5.

In one example, the DB 106 stores and indexes data related to social media posts, such as text, images, metadata, and other content shared by social media users. The DB 106 may further store a data structure that describes the connections between social media users (e.g., friends, followers, etc.). In a further example, the DB 106 may store a codebook generated by the AS 104 or by another computer that maps social media posts to topics. The DB 106 may also store maps that indicate the frequency distributions of these topics in groups of social media posts. The DB 106 may further store models for individual social media users that can be used to predict the future posting behaviors (e.g., topics and frequencies) of the individual social media users.

In one example, the access networks 120 may be in communication with one or more user endpoint devices (also referred to as "endpoint devices" or "UEs") 108, 110, 112, and 114. In one example, the user endpoint devices 108, 110, 112 and 114 may be any type of endpoint device such as a desktop computer or smart television or a mobile endpoint device such as a cellular telephone, a smart phone, a tablet computer, a laptop computer, a netbook, an ultrabook, a portable media device (e.g., an MP3 player), a gaming console, a portable gaming device, a set top box, microconsole, a digital media player, or the like, or even a wearable device such as a smart watch. Any of the user endpoint devices 108, 110, 112, and 114 may be configured as a computer similar to that illustrated in FIG. 5 and described in greater detail below.

It should also be noted that the network 100 has been simplified. For example, the network 100 may include other network elements (not shown) such as border elements, routers, switches, policy servers, security devices, firewalls, a content distribution network (CDN) and the like.

FIG. 2 depicts a high level block diagram illustrating one example of an application server 200 of the present disclosure. The application server 200 may function as the AS 104 of the network 100 illustrated in FIG. 1. As such, the application server 200 may obtain a plurality of social media posts related to a specific user as input and generate as an output a model from which the specific user's future posting actions can be predicted.

To this end, one example of the application server 200 comprises a topic extractor 202, a codebook generator 204, a mapper 206, a model builder 208, and a posting predictor 210.

The topic extractor 202 obtains a plurality of social media posts 214 (containing, for example, text data, image data, metadata, or other content). The plurality of social media posts 214 may include, for example, posts created by a plurality of different users across a social media application. The plurality of social media posts 214 may be retrieved, e.g., in electronic form, from a database 212 (which may be, for instance, the DB 106 of FIG. 1) or they may be obtained in substantially real time (e.g., subject to network latency), e.g., from user endpoint devices such as the UEs 108, 110, 112, and 114. From the plurality of social media posts 214, the topic extractor 202 extracts one or more topics 216 or subjects to which the plurality of social media posts 214 may relate. The topic extractor 202 may, for instance apply a topic detection technique or a clustering algorithm to the plurality of social media posts 214. In one example, the topic extractor 202 extracts a predefined number of topics 216 (e.g., M topics) from the plurality of social media posts 214.

The topic extractor 202 forwards the extracted topics 216 to the codebook generator 204, which creates a codebook 218 based on the one or more topics 216. The codebook 218 may be a repository or list of the topics 216 extracted by the topic extractor 202. In one example, the codebook 218 may assign a unique identifier (e.g., $\Im_1$-$\Im_M$) to each topic 216.

The codebook generator 204 forwards the codebook 218 to the mapper 206. The mapper 206 also obtains the plurality of social media posts 214 from which the codebook 218 was generated. The mapper 206 then uses the codebook 218 to map the plurality of social media posts 214 to the topics 216. This may result in the mapper 206 generating a distribution 220 that indicates the frequencies with which the topics 216 occur in the plurality of social media posts 214.

The mapper 206 forwards the distribution 220 to the model builder 208. The model builder 208 also obtains a data set that is related to a specific user of the social media application. The data set may include identities of the specific user's connections 222 in the social media application, a plurality of posts 224 made by the specific user in the social media application during a defined time frame, and a plurality of posts 226 made by the specific user's connections 222 in the social media application during the defined time frame. The model builder 208 uses the distribution 220 to generate a user model 228 of the specific user's social media posting behavior from the data set. The model builder 208 may use a modeling algorithm such as a regression technique or a deep learning neural network in order to build the user model 228. The user model 228 accounts not only for the topics about which the specific user posts (and potentially the frequencies with which he or she posts about the topics), but also for the influence of the specific user's connections (and their posting behaviors) on the topics about which the specific user posts (and also potentially the frequencies with which he or she posts about the topics).

The model builder 208 may store the user model 228 in the database 212, or may directly forward the user model 228 to the posting predictor 210. The posting predictor 210 also obtains a data set that is related to a specific user of the social media application. The data set may include identities of the specific user's connections 222 in the social media application, a plurality of posts 224 made by the specific user in the social media application during a defined time frame, and a plurality of posts 226 made by the specific user's connections 222 in the social media application during the defined time frame. The posting predictor 210 may also obtain the codebook 218, e.g., directly from the codebook generator 204 or from the database 212. The posting predictor 210 applies the user model 228 and/or the codebook 218 to the data set in order produce to a set of topics and corresponding distributions 230 that are predicted to occur in the specific user's posts at a selected point or window in time. The predicted set of topics and corresponding distributions 230 may be stored in the database 212 or may be forwarded to a remote computer or system.

Figure 3:
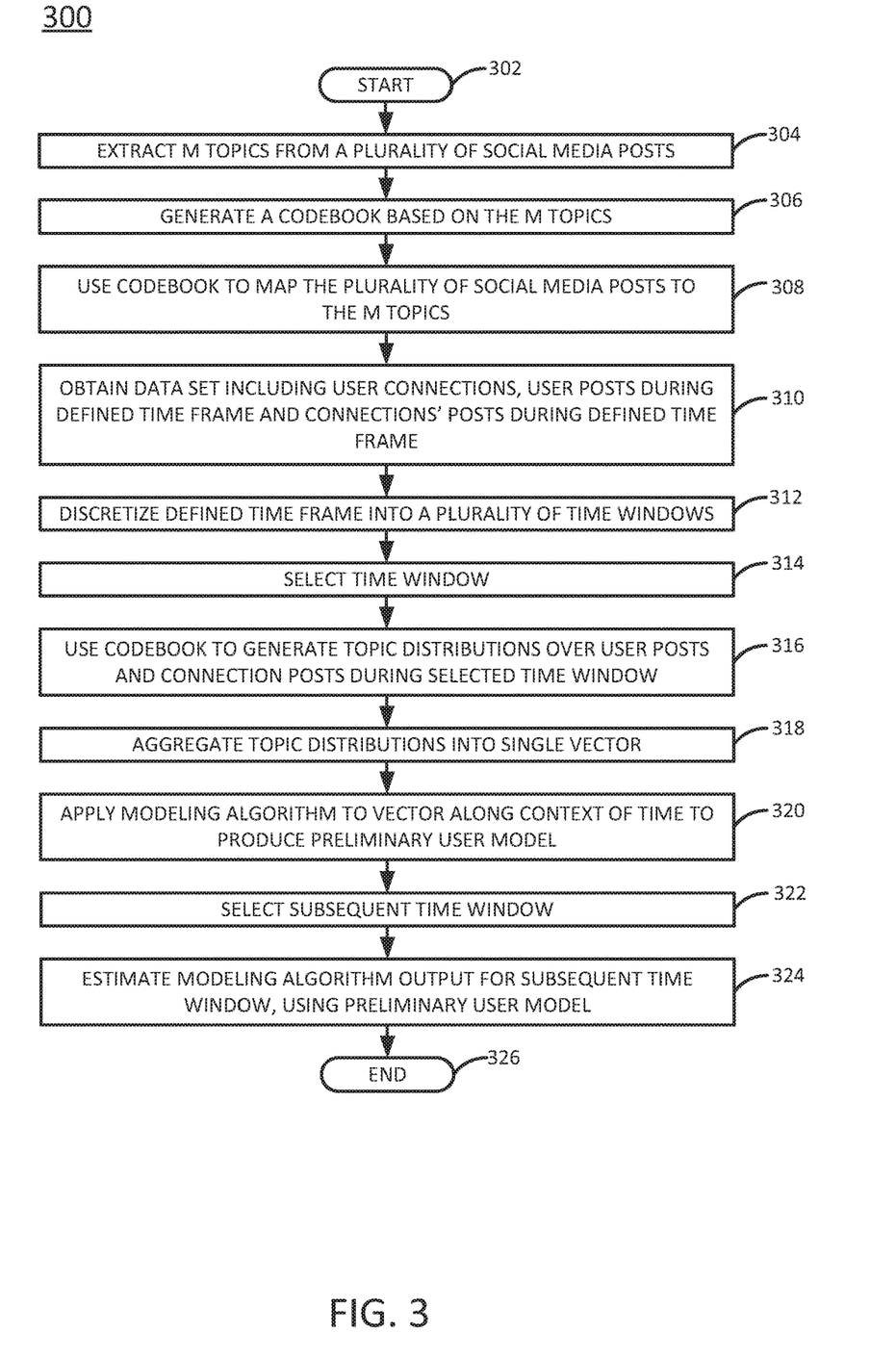
FIG. 3 is a flow diagram illustrating one example of a method for mapping a plurality of social media posts made by a specific user to one or more topics.

FIG. 3 is a flow diagram illustrating one example of a method 300 for mapping a plurality of social media posts made by a specific user to one or more topics. In one example, the method 300 may be implemented by various components of the application server 200 of FIG. 2. In particular, the method 300 may be used to train components of the application server 200 and to generate a user model that can be used to predict a specific user's future social media posting behavior. As such, reference is made in the discussion of the method 300 to various components of the application server 200. Such reference is made for the sake of example, however, and is not intended to be limiting.

The method 300 begins in step 302. In step 304, the topic extractor extracts one or more topics from a plurality of social media posts. The plurality of social media posts may be retrieved, e.g., in electronic form, from a database such as the DB 106 of FIG. 1, or they may be retrieved in substantially real time (e.g., subject to network latency) from the an application server such as the AS 104 of FIGS. 1 and 2. In one example, the social media posts may have been created by a plurality of different users across a social media application. The social media posts may include text data, image data, metadata, or other content. In one example, most or all of the social media posts are unlabeled (i.e., are not pre-classified into topics). In one example, an unsupervised topic detection technique or a clustering algorithm is used to extract the topics from the plurality of social media posts. In a further example, the number of topics extracted from the plurality of social media posts is predefined (e.g., M topics). In one example, multiple topics may be extracted from a single social media post.

In step 306, the codebook generator generates a codebook based on the one or more topics extracted by the topic extractor. The codebook may be a repository or list of the topics extracted in step 304. In one example, the codebook may assign a unique identifier (e.g., $\Im_1$-$\Im_M$) to each topic.

In step 308, the mapper uses the codebook to map the plurality of social media posts to the topics extracted in step 304. This may result in the mapper generating a distribution that indicates the frequencies with which the topics occur in the plurality of social media posts (e.g., the frequencies with which the users generates posts related to the topics). For example, a single social media post may be represented by a mixture of densities representing individual probabilities that the social media post is associated with different topics. In this case, when mapping the plurality of social media posts using the codebook, the plurality of social media posts can be represented by a combination of the mixtures of probability densities for each topic (e.g., a sum, a product, or a weighted sum or product of the mixtures of probability densities). For instance, given a codebook including a set of topics $\Im_1$-$\Im_M$, a set of social media posts may be mapped to produce a distribution that indicates the respective occurrences of the topics in the set of social media posts (e.g., $\Im_1$: 3 occurrences; $\Im_2$: 2 occurrences; . . . ; $\Im_M$: 5 occurrences).

In step 310, the model builder obtains a data set related to a specific user of social media (i.e., a user for whom a predictive model is to be built). In one example, the data set includes: identities of the specific user's connections in the social media application, a plurality of posts made by the specific user in the social media application during a defined time frame, and a plurality of posts made by the specific user's connections in the social media application during the defined time frame.

In step 312, the model builder discretizes the defined time frame into a plurality of time windows t-$t_x$. In one example, all of the time windows are of an equal size, e.g., $\Delta t$.

In step 314, the model builder selects a time window from the plurality of time windows. In one example, the model builder begins by selecting the earliest time window from among the plurality of time windows.

In step 316, the model builder uses the codebook generated in step 306 to generate topic distributions over the specific user's posts during the selected time window and over his or her connections' posts during the selected time window. That is, the model builder maps the specific user's posts and his or her connections' posts to topics using the codebook and generates, for each of the users (i.e., including the specific user and each user in his or her connections) a topic distribution over their posts during the selected time window.

In step 318, the model builder aggregates the topic distributions generated in step 316 into a single vector or distribution. In one example, the single vector or distribution is generated by adding or multiplying, potentially with weights, the individual topic distributions. In another example, the single vector or distribution is generated by concatenating the individual topic distributions.

In step 320, the model builder applies a modeling algorithm to the single vector or distribution generated in step 318. In one example, the modeling algorithm is applied along the context of time (e.g., the time frame covered by the plurality of time windows, such as nighttime versus daytime, weekday versus weekend, etc.), which may be represented as a second vector. In one example, the modeling algorithm is a regression technique or a deep learning neural network, but in other examples, other modeling algorithms may be applied. Application of the modeling algorithm in step 320 may result in the building of a preliminary user model that can be used to predict future posting actions (e.g., timing and/or content of future posts) by the specific user.

In step 322, the model builder selects a subsequent time window, i.e., a time window of the plurality of time windows that is subsequent to the time window selected in step 314. In one example, the subsequent time window is the immediately subsequent time window.

In step 324, the model builder estimates an output of the modeling algorithm for the specific user's posts that occurred during the subsequent time window, using the preliminary user model built in step 320. Estimating the modeling algorithm output in step 322 may help to refine the preliminary user model.

The method 300 ends in step 326. All or some of steps 314-324 of the method 300 may be repeated before ending the method 300, in order to further refine the preliminary user model.

Figure 4:
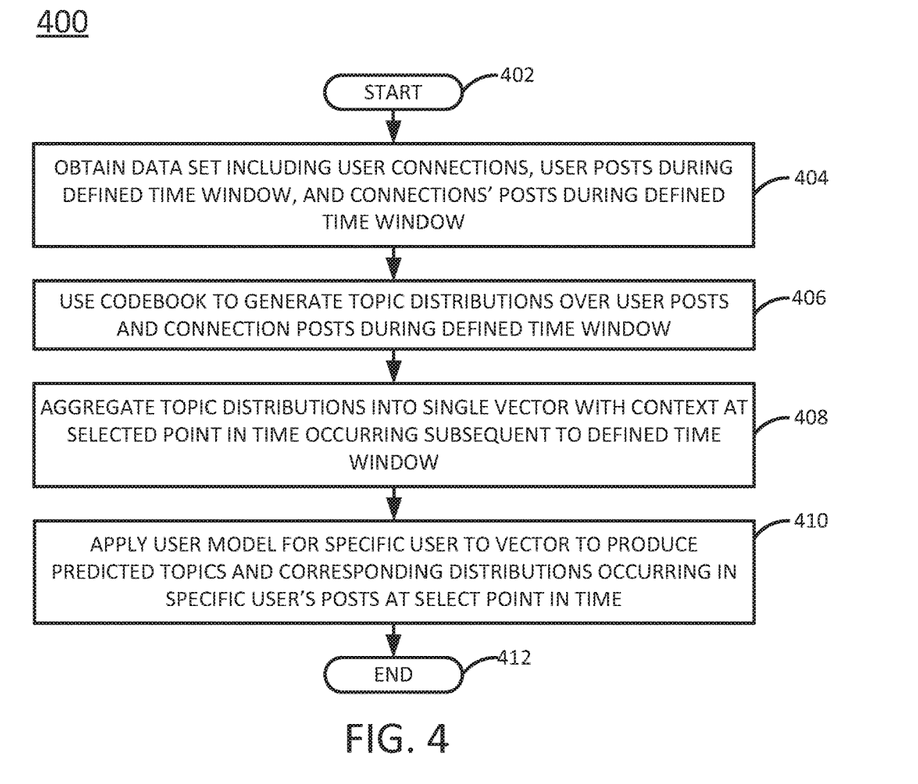
FIG. 4 is a flow diagram illustrating one example of a method for predicting a future social media posting behavior of a specific user.

FIG. 4 is a flow diagram illustrating one example of a method 400 for predicting a future social media posting behavior of a specific user. In one example, the method 400 may be implemented by various components of the application server 200 of FIG. 2. In particular, the method 400 may be used by components of the application server 200, in conjunction with a model of the posting behavior of the specific user, to predict the specific user's future social media posting behavior. As such, reference is made in the discussion of the method 400 to various components of the application server 200. Such reference is made for the sake of example, however, and is not intended to be limiting.

The method 400 begins in step 402. In step 404, the posting predictor obtains a data set related to a specific user of social media (i.e., a user for whom a predictive model is to be built). In one example, the data set includes: identities of the specific user's connections in the social media application, a plurality of posts made by the specific user in the social media application during a defined window of time, and a plurality of posts made by the specific user's connections in the social media application during the defined window of time.

In step 406, the posting predictor uses the codebook generated during training (e.g., in step 306 of the method 300) to generate topic distributions over the specific user's posts during the defined time window and over his or her connections' posts during the defined time window. That is, the posting predictor maps the specific user's posts and his or her connections' posts to topics using the codebook and generates, for each of the users (i.e., including the specific user and each user in his or her connections) a topic distribution over their posts during the defined time window.

In step 408, the posting predictor aggregates the topic distributions generated in step 406 into a single vector or distribution with the context at a selected point or window in time occurring subsequent to the defined time window. In one example, the single vector or distribution is generated by adding or multiplying, potentially with weights, the individual topic distributions. In another example, the single vector or distribution is generated by concatenating the individual topic distributions.

In step 410, the posting predictor applies the user model for the specific user (e.g., as built in accordance with the method 300) to the vector generated in step 408. The result is a set of topics and corresponding distributions that are predicted to occur in the specific user's posts at the selected point or window in time.

The method 400 ends in step 412.

The method 400 thus is able to predict the topics about which a specific user will post, and the frequencies with which the user will post about these topics, at a selected point or window in time (e.g., a future point in time). Information about the specific user's past posts, as well as information about the posts of the specific user's connections, is used to guide the prediction. Thus, the method 400 takes into account not just the specific user's previous behaviors, but also the influence that the specific user's connections and their posting behaviors have on the specific user's posting behaviors.

FIG. 5 is a high-level block diagram of the social media posting prediction method that is implemented using a special purpose computing device 500. As discussed above, the application servers 104 and 200 of FIGS. 1 and 2 may be implemented as part of a special purpose computing device.

As depicted in FIG. 5, the special purpose computing device 500 comprises a hardware processor element 502 (e.g., a central processing unit (CPU), a microprocessor, or a multi-core processor), a memory 504, e.g., random access memory (RAM) and/or read only memory (ROM), a module 505 for predicting a specific user's future social media posting behavior, and various input/output devices 506 (e.g., storage devices, including but not limited to, a tape drive, a floppy drive, a hard disk drive or a compact disk drive, a receiver, a transmitter, a speaker, a display, a speech synthesizer, a network interface card (NIC), an output port, an input port, and a user input device (such as a keyboard, a keypad, a mouse, a microphone and the like)). Although only one processor element is shown, it should be noted that the special purpose computing device 500 may employ a plurality of processor elements. Furthermore, although only one special purpose computing device 500 is shown in the figure, if the methods as discussed above are implemented in a distributed manner for a particular illustrative example, i.e., the steps of the above methods or the entire methods are implemented across multiple special purpose computing devices or application servers, then the special purpose computing device 500 of this figure is intended to represent each of those multiple special purpose computing devices or application servers.

It should be noted that the present disclosure can be implemented in software and/or in a combination of software and hardware, e.g., using application specific integrated circuits (ASIC), a special purpose computer or any other hardware equivalents, e.g., computer readable instructions pertaining to the respective systems and/or methods discussed below can be used to configure a hardware processor to perform the steps functions and/or operations of the systems and methods disclosed herein. In one example, instructions and data for the present module or process 505 for predicting a specific user's future social media posting behavior (e.g., a software program comprising computer-executable instructions) can be loaded into memory 504 and executed by hardware processor element 502 to implement the steps, functions or operations as discussed herein in connection with the disclosed systems and methods. For instance, the module 505 may include a plurality of programming code components configured to performed different steps or sets of steps of the disclosed methods.

The processor executing the computer readable or software instructions relating to the above described methods can be perceived as a programmed processor or a specialized processor. As such, the present module 505 for predicting a specific user's future social media posting behavior (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server. In addition, it should be noted that the hardware processor 502 can be configured or programmed to cause other devices to perform one or more operations as discussed above. In other words, the hardware processor 502 may serve the function of a central controller directing other devices to perform the one or more operations as discussed below.

The flowcharts and block diagrams in the Figures illustrate the architecture, functionality, and operation of possible implementations of systems and methods according to various examples of the present disclosure. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

Examples of the present disclosure may be a system, a computer-implemented method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    extracting a plurality of topics from a plurality of unlabeled social media posts;
    mapping the plurality of topics to a plurality of frequencies, each frequency in the plurality of frequencies indicating how often a corresponding topic in the plurality of topics occurs in the plurality of unlabeled social media posts, wherein the mapping comprises generating a codebook that identifies each topic of the plurality of topics by a unique identifier;
    predicting, based in part on the plurality of frequencies, a future social media posting behavior of a specific social media user, wherein the future social media posting behavior includes a specific topic about which the specific social media user is likely to post at a time in the future and a frequency with which the specific topic is likely to occur in posts of the specific social media user that are created at the time in the future;
    identifying, using the codebook, a first set of frequencies, wherein the first set of frequencies indicates frequencies with which the plurality of topics occurred in posts made by the specific social media user during a first defined window of time;
    identifying, using the codebook, a second set of frequencies, wherein the second set of frequencies indicates frequencies with which the plurality of topics occurred in posts made by connections of the specific social media user during the first defined window of time;
    aggregating the first set of frequencies and the second set of frequencies into a single vector; and
    applying a modeling algorithm to the single vector along a context of time to produce a user model for the specific social media user.

2. The computer-implemented method of claim 1, wherein the extracting is performed using an unsupervised learning technique.

3. The computer-implemented method of claim 1, wherein the mapping comprises:
    generating, using the codebook, a distribution that identifies the plurality of frequencies.

4. The computer-implemented method of claim 1, wherein the predicting comprises:
    modeling previous posting behavior of the specific social media user using the codebook, wherein the modeling accounts for an influence of posting behaviors of the connections of the specific social media user; and
    estimating the specific topic and the frequency with which the specific topic is likely to occur in posts of the specific social media user based on the modeling.

5. The computer-implemented method of claim 4, wherein the modeling comprises:
    obtaining a data set relating to the specific social media user, wherein the data set comprises a list of the connections, a plurality of posts made by the specific social media user during a defined time frame, and a plurality of posts made by the connections during the defined time frame.

6. The computer-implemented method of claim 1, wherein the modeling algorithm is a regression technique.

7. The computer-implemented method of claim 1, wherein the modeling algorithm is a deep learning neural network.

8. The computer-implemented method of claim 1, further comprising:
    selecting a second defined window in time occurring subsequent to the first defined window in time; and
    estimating an output of the modeling algorithm for posts made by the specific social media user during the second defined window of time, to refine the user model.

9. The computer-implemented method of claim 4, wherein the estimating comprises:
    identifying, using the codebook, a third set of frequencies, wherein the third set of frequencies indicates frequencies with which the plurality of topics occurred in posts made by the specific social media user during a second defined window of time occurring subsequent to the first defined window in time;
    identifying, using the codebook, a fourth set of frequencies, wherein the fourth set of frequencies indicates frequencies with which the plurality of topics occurred in posts made by the connections during the second defined window of time;
    aggregating the third set of frequencies and the fourth set of frequencies into a single vector with a context at a point in time for which the future social media posting behavior is to be predicted; and
    applying the user model to the single vector along a context of time to produce a prediction indicating likely topics of the plurality of topics that the specific social media user is likely to post about at the point in time and frequencies with which the specific social media user is likely to post about the likely topics.

10. A computer readable storage medium encoded with instructions executable by a processor, wherein the instructions comprise:
    instructions to extract a plurality of topics from a plurality of unlabeled social media posts;
    instructions to map the plurality of topics to a plurality of frequencies, each frequency in the plurality of frequencies indicating how often a corresponding topic in the plurality of topics occurs in the plurality of unlabeled social media posts, wherein the instructions to map comprise instructions to generate a codebook that identifies each topic of the plurality of topics by a unique identifier;
    instructions to predict, based in part on the plurality of frequencies, a future social media posting behavior of a specific social media user, wherein the future social media posting behavior includes a specific topic about which the specific social media user is likely to post at a time in the future and a frequency with which the specific topic is likely to occur in posts of the specific social media user that are created at the time in the future;
instructions to identify, using the codebook, a first set of frequencies, wherein the first set of frequencies indicates frequencies with which the plurality of topics occurred in posts made by the specific social media user during a first defined window of time;
instructions to identify, using the codebook, a second set of frequencies, wherein the second set of frequencies indicates frequencies with which the plurality of topics occurred in posts made by connections of the specific social media user during the first defined window of time;
instructions to aggregate the first set of frequencies and the second set of frequencies into a single vector; and
instructions to apply a modeling algorithm to the single vector along a context of time to produce a user model for the specific social media user.

11. The computer readable storage medium of claim 10, wherein the extracting is performed using an unsupervised learning technique.

12. The computer readable storage medium of claim 10, wherein the instructions to map comprise:
instructions to generate, using the codebook, a distribution that identifies the plurality of frequencies.

13. The computer readable storage medium of claim 10, wherein the instructions to predict comprise:
instructions to model previous posting behavior of the specific social media user using the codebook, wherein the modeling accounts for an influence of posting behaviors of the connections of the specific social media user; and
instructions to estimate the specific topic and the frequency with which the specific topic is likely to occur in posts of the specific social media user based on the modeling.

14. The computer readable storage medium of claim 13, wherein the instructions to model comprise:
instructions to obtain a data set relating to the specific social media user, wherein the data set comprises a list of the connections, a plurality of posts made by the specific social media user during a defined time frame, and a plurality of posts made by the connections during the defined time frame.

15. The computer readable storage medium of claim 10, wherein the modeling algorithm is a regression technique.

16. The computer readable storage medium of claim 10, wherein the modeling algorithm is a deep learning neural network.

17. The computer readable storage medium of claim 10, further comprising:
instructions to select a second defined window in time occurring subsequent to the first defined window in time; and
instructions to estimate an output of the modeling algorithm for posts made by the specific social media user during the second defined window of time, to refine the user model.

18. The computer readable storage medium of claim 10, wherein the instructions to estimate comprise:
instructions to identify, using the codebook, a third set of frequencies, wherein the third set of frequencies indicates frequencies with which the plurality of topics occurred in posts made by the specific social media user during a second defined window of time occurring subsequent to the first defined window in time;
instructions to identify, using the codebook, a fourth set of frequencies, wherein the fourth set of frequencies indicates frequencies with which the plurality of topics occurred in posts made by the connections during the second defined window of time;
instructions to aggregate the third set of frequencies and the fourth set of frequencies into a single vector with a context at a point in time for which the future social media posting behavior is to be predicted; and
instructions to apply the user model to the single vector along a context of time to produce a prediction indicating likely topics of the plurality of topics that the specific social media user is likely to post about at the point in time and frequencies with which the specific social media user is likely to post about the likely topics.

19. An apparatus, comprising:
a hardware processor element; and
a plurality of programming code components that, when executed by the hardware processor element, cause the hardware processor element to perform operations comprising:
extracting a plurality of topics from a plurality of unlabeled social media posts;
mapping the plurality of topics to a plurality of frequencies, each frequency in the plurality of frequencies indicating how often a corresponding topic in the plurality of topics occurs in the plurality of unlabeled social media posts, wherein the mapping comprises generating a codebook that identifies each topic of the plurality of topics by a unique identifier;
predicting, based in part on the plurality of frequencies, a future social media posting behavior of a specific social media user, wherein the future social media posting behavior includes a specific topic about which the specific social media user is likely to post at a time in the future and a frequency with which the specific topic is likely to occur in posts of the specific social media user that are created at the time in the future;
identifying, using the codebook, a first set of frequencies, wherein the first set of frequencies indicates frequencies with which the plurality of topics occurred in posts made by the specific social media user during a first defined window of time;
identifying, using the codebook, a second set of frequencies, wherein the second set of frequencies indicates frequencies with which the plurality of topics occurred in posts made by connections of the specific social media user during the first defined window of time;
aggregating the first set of frequencies and the second set of frequencies into a single vector; and
applying a modeling algorithm to the single vector along a context of time to produce a user model for the specific social media user.

20. The apparatus of claim 19, wherein the apparatus is an application server.

* * * * *